United States Patent Office 2,912,334
Patented Nov. 10, 1959

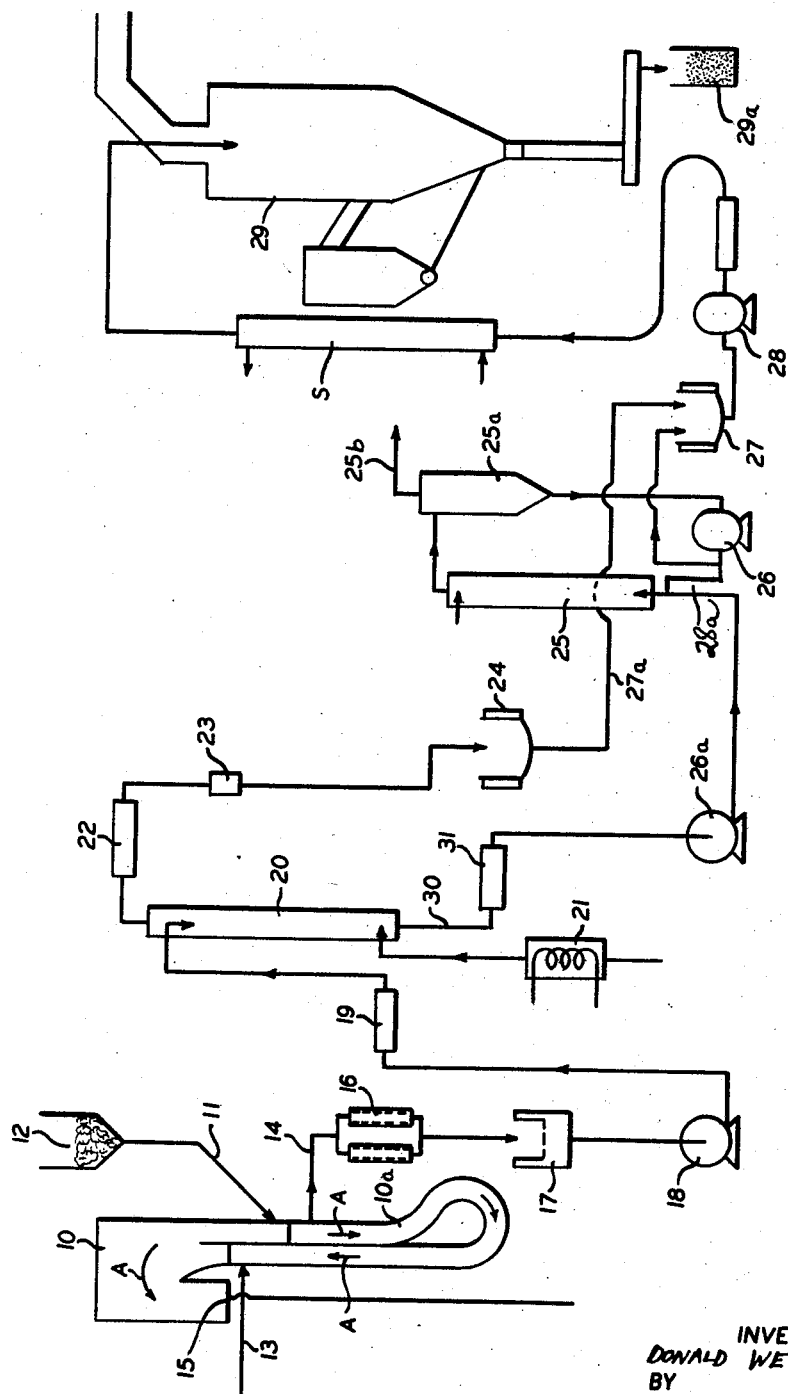

2,912,334

POWDERED SOLUBLE TEA EXTRACT AND PROCESS FOR ITS MANUFACTURE

Donald Wetherilt, Clarens, Switzerland, assignor to Afico S.A., Lausanne, Switzerland Application March 20, 1957, Serial No. 647,406

Claims priority, application Switzerland March 22, 1956

3 Claims. (Cl. 99—77)

My invention relates to a new and improved method of making a powdered tea extract which is wholly soluble in water and which is preferably free from non-tea ingredients or foreign additives. The invention also includes the new and improved tea extract, irrespective of the process of manufacture.

The invention includes a number of important steps for securing a powdered extract of superior flavor, and which is easily soluble in hot water.

In the first step of the process, tea leaves are continuously extracted by countercurrent extraction with water at a temperature of 90° C.–100° C. during a short period, such as ten minutes or less. The extracting temperature may be lower than 90° C. By reason of this short maximum period of countercurrent extraction of ten minutes, I prevent the formation of a bitter or stewed taste in the beverage which is made from the final powdered extract. This short period of countercurrent extraction is sufficient to extract at least a majority of the aromatic and flavoring ingredients, such as the tea polyphenols, the essential oil or oils, caffeine and others. While a longer period of countercurrent extraction may be used, such as 12–15 minutes, careful research has shown that a maximum counter-current period of extraction of ten minutes at 90° C.–100° C. is highly preferable, and that a period of six minutes is the best.

This countercurrent extraction results in an original, dilute tea extract.

The aromatic and flavoring ingredients are separated from said original, dilute tea extract. This may be done with steam at 100° C., using a well-known steam stripping column for this purpose. This steam stripping method is superior to solvent extraction.

This stripping step results in a separated aqueous fraction of the aromatic and flavoring ingredients and a residual stripped tea extract.

The weight of the steam which is used in the stripping operation is preferably four percent to five percent of the weight of the original, dilute tea extract. This is the best ratio for securing a superior final powdered extract.

The residual or stripped extract is evaporated and concentrated under vacuum, at a temperature of substantially 30° C. to 55° C. This temperature of 55° C. corresponds to a pressure of 120 millimeters of mercury, which is the pressure of water vapor at 55° C.

This evaporation results in an aqueous concentrate of the stripped extract.

If a lower evaporation temperature of 30° C. is used at the corresponding vacuum, solids are precipitated in the residual extract. If a higher evaporation pressure is used, there is a deterioration in flavor of the final powdered extract and the beverage made therefrom.

The separated aqueous aromatic fraction and the concentrated stripped extract are mixed. The mixture is impregnated with a gas, such as carbon dioxide or nitrogen, and the impregnated mixture is spray-dried. The ratio of the impregnating gas is a factor in controlling the bulk density or specific gravity of the final spray-dried powder extract. This powder extract has a maximum bulk density of 0.20 gram per cubic centimeter. Upon dissolving 0.8 gram to one gram of this final powder per 200 cubic centimeters of hot water, the resultant beverage has the typical character and composition of a fresh tea infusion.

As one example, 100 kilograms of tea leaves are thus extracted by countercurrent extraction with 600 kilograms to 1500 kilograms of water which has an extraction temperature of substantially 90° C. to 100° C. This extraction, depending on the amount of extracting water, may result in an original, dilute tea extract, which has from 2.5% to 10% by weight of dissolved tea solids, so that about 30 kilograms (dry weight) of water-soluble tea solids are extracted in some cases from said 100 kilograms of tea leaves. The weight of this original, dilute tea extract is from 300 kilograms to 1200 kilograms, depending on the amount of extracting water and upon the amount thereof which is absorbed by the tea leaves.

The next step if steam-stripping is used, is the steam-stripping step, by means of steam at 100° C. As above noted, the weight of the stripping steam is preferably four percent to five percent of the weight of the original, dilute tea extract.

The steam-stripping step separates an aqueous aromatic solution or aqueous aromatic fraction of the aromatic and flavoring ingredients. As one example, the weight of said aqueous fraction is 20 kilograms to 24 kilograms, about 3% to 4% of the weight of the dilute extract. This separated aqueous fraction is promptly cooled below 70° C., as to 55° C. or below.

This stripping operation leaves a residual, dilute, aqueous extract, which is free or substantially free from said volatile aromatic or flavoring ingredients. This stripped extract is promptly cooled below 70° C., as to 55° C. or below.

This residual or stripped extract is then concentrated by evaporation, as at a pressure of 30 to 120 millimeters of mercury. The temperature of the evaporating step is substantially 30° C. to 55° C. This results in a stripped or residual concentrate of the residual or stripped extract which has 40% to 55% of dissolved tea solids by weight. The weight of this stripped, concentrated extract is 60 kilograms to 75 kilograms, as one example.

The concentrated stripped extract is then promptly mixed at 45° C. to 50° C. in proper proportion with the concentrated aqueous solution of the previously separated fraction of the aromatic or flavoring ingredients, in order to provide a final liquid mixture which is equivalent in composition to a concentrate of the original dilute tea-extract.

This final liquid mixture is promptly impregnated with a suitable inert gas, such as carbon dioxide or nitrogen. The use of said gas in the subsequent spray-drying operation reduces the bulk density of the final powder.

This final impregnated liquid mixture is then dried, by spray drying, to produce the final water-soluble powder, whose bulk density is a maximum of 0.20 gram per cubic centimeter such as a bulk density of 0.15 to 0.18 gram per cubic centimeter.

The period in which the original dilute extract is kept above 70° C. should be as short as possible, in order to prevent objectionable dark color and a bitter taste in the beverage which is made from the powdered extract. This applies to the concentrated stripped or residual extract, and also to the fraction of the separated aromatic or flavoring ingredients.

If the original dilute tea extract is spray-dried, there is considerable loss of aromatic or flavoring ingredients in the spray-drying operation.

By first separating the aromatic or flavoring ingredients from the original dilute extract as a separated aromatic fraction and then separately concentrating the stripped or residual extract and then mixing these two liquids, the spray drying operation results in little or no loss of aromatic or flavoring ingredients.

The process may be a batch process or a continuous process.

The concentration by evaporation of the residual or stripped extract should be during a minimum period, as about five to ten minutes, in order to minimize any physical or chemical change in said stripped extract during the concentration. This condition is best fulfilled by using a continuous evaporator.

Instead of concentrating the stripped extract by evaporation, said stripped extract can be frozen, and the frozen water can be removed by the well-known lyophilizing process, in which water is evaporated from a frozen product.

Alternatively, the stripped extract can be chilled to form a mixture of frozen water which is substantially or largely free from solute, and the substantially pure frozen water can be separated mechanically, as by filtration, from the aqueous stripped extract.

It is well known to strip volatile ingredients from a liquid by means of a packed column or bubble-cap of the type used in distillation, and such column can be used in the stripping step.

It is also well known to strip volatile ingredients from a liquid by introducing steam into said liquid. Any stripping method or apparatus can be used for separating the volatile ingredients.

By any steam stripping method, the volatile aromatic or flavoring ingredients of the original dilute tea-extract are vaporized, and the vaporized aromatic and flavoring ingredients, mixed with water vapor are condensed to form an aqueous, sepated solution or fraction of said aromatic or flavoring ingredients.

The aromatic and flavoring ingredients may be centrifugally separated from the steam which is used to volatilize them.

The vaporized aromatic and flavoring ingredients which are carried along with the stripping steam, may be separated from the original, dilute tea-extract in a known steam-stripping column as a packed column or bubble-cap column, in which the weight of the steam is 4% to 5% of the weight of the original, dilute tea-extract. Steam-stripping and distillation may be combined, in order to separate the volatile aromatic or flavoring ingredients from the original dilute extract.

If a packed distillation column is used in the steam stripping operation, a highly concentrated aqueous fraction or extract of the aromatic or flavoring ingredients is secured. The weight of this separated, aqueous aromatic fraction is substantially 3% to 4% of the weight of the original dilute extract which enters the stripping column.

The vaporized aromatic or flavoring ingredients together with the water vapor mixed therewith, can be condensed in a surface condenser by using condensing water at 20° C.–30° C. or at a lower temperature. This should be done quickly, with exclusion of air.

During the stripping step, care should be taken to prevent foaming, which results in loss of aromatic or flavoring ingredients.

The final mixture which is spray-dried, should have from 35% to 50% of solids by weight.

The annexed diagrammatic drawing shows one of the many types of apparatus which can be used to practice the invention.

The extractor 10 is of known construction. It has an extracting tube 10a which has the general shape of a flattend horseshoe. It works under atmospheric pressure.

The tea leaves are stored in a magazine 12. The tea leaves are fed continuously in suitable weight ratio to the extracting water, through inlet pipe 11, into the right leg of tube 10a. The flow of the tea leaves through tube 10a is clockwise, as indicated by the three arrows A.

The tea leaves are forced through tube 10a in any suitable manner, as by applying pressure to the tea leaves in magazine 12, or by a conventional chain conveyor which has arms for conveying said tea leaves.

The hot extracting water is forced into extracting tube 10a through pipe 13, so that said extracting water flows counterclockwise or countercurrent to the clockwise flow of the tea leaves in the extracting tube 10a. The exhausted tea leaves which pass out of the extracting tube 10a are removed by a known conveyor through the outlet 15 of extractor 10.

The original, dilute tea extract flows out through the pipe 14.

The tea leaves are thus continuously extracted in a countercurrent system, with hot water whose temperature is substantially 90° C. to 100° C. or below 90° C. The quantity of tea leaves fed per hour, and the amount of extracting water fed per hour, are controlled with respect to the cross-section of extracting tube 10a, so that the maximum period of contact of the tea leaves with the water in tube 10a is a maximum of ten minutes, preferably not more than six minutes.

The original, dilute tea extract which flows through pipe 14, is very similar in composition to a tea infusion which is prepared in the home in the usual manner.

In order to extract 100 kilograms of tea leaves in the tube 10a, 600 kilograms to 1500 kilograms of extracting water are used, preferably 800 kilograms to 1000 kilograms of water.

Part of said extracting water is absorbed by the tea leaves which are discharged through the outlet or port 15.

Depending upon the amount of extracting water, about 300 to 1200 kilograms of the original, dilute tea extract flow out of pipe 14. This original, dilute tea extract has 2.5% to 10% by weight of dissolved solids. Preferably, the weight of said original extract is 500 to 700 kilograms, per 100 kilograms of tea leaves. Its outlet temperature is 85° C. to 90° C. or below 85° C. in some cases. By reason of said countercurrent extraction, the dilute tea extract which flows out of pipe 14 does not lose the aromatic or flavoring ingredients. This original dilute extract may have 30 kilograms of dissolved tea solids, per 100 kilograms of tea leaves.

The specific gravity of the dilute tea extract which flows through pipe 14 is continuously measured by a conventional device which is installed in pipe 14.

The original, dilute tea extract is successively filtered through a coarse filter 16 and through a fine filter 17. The latter filter 17 may be made of nylon.

The original dilute, filtered extract is fed by pump 18 through a conventional heater 19, into the top of a stripping column 20, which may be the well-known packed column. The original, dilute tea extract enters the top of said column 20 at a temperature of 90°–100° C. This inlet temperature may be as low as 70° C. The filtered extract flows downwardly through said stripping column 20 in the usual manner. Stripping steam is generated in a boiler 21. This stripping steam enters the bottom of column 20 at a temperature of 95° C.–100° C., so that the upwardly flowing stripping steam vaporizes and strips the volatile aromatic or flavoring ingredients of the dilute tea extract. There may be or may not be some condensation of the steam in the stripping column. The stripped and vaporized volatile aromatic or flavoring ingredients and some water vapor flow from the top of the stripping column 20 through the condenser 22, where the respective vapors are condensed to provide an aqueous fraction of the concentrated stripped aromatic or flavoring ingredients. The condensate flows through the cooler 23, where the condensate is cooled below 70° C., as to about 50° C. The cooled condensate flows into the storage tank 24, which may have a cover.

In order to strip 500 kilograms to 600 kilograms of the original, dilute tea extract which enters the top of stripping column 20, from 20 to 24 kilograms of steam preferably are used. The weight of the stripping steam may be about four percent of the weight of the original, dilute extract. About 20 to 24 kilograms of the aqueous, stripped fraction of the aromatic or flavoring ingredients are obtained in the tank 24 for 600 kilograms of original extract. Hence, as above noted, the weight of the stripping steam may be 4% of the weight of the original, dilute tea extract, and the weight of the separated aromatic fraction may be 3% to 4% of the weight of said original, dilute tea extract.

The stripped or residual dilute extract flows from the bottom of stripping column 20 through pipe 30, through cooler 31, where said stripped extract is promptly cooled below 70° C., as to about 50° C.

The stripped extract is then concentrated, preferably continuously, to provide 55 to 75 kilograms of concentrate which may have 40 to 55% by weight of solids.

The stripped extract is concentrated under vacuum in conventional apparatus 25—25a. The element 25 is a known heater, which has a tube or set of tubes through which the stripped extract is pumped, and a heating medium is flowed through said element 25 to around its internal tube or tubes in order to heat the extract to 30° C.–55° C. The element 25a is the separator, in which the generated water vapor is separated from the extract at 30° C.– 55° C. This separator 25a has a top outlet 25b for the evolved and separated water vapor. This outlet 25b is connected to a conventional condenser and vacuum pump, so that the separator 25a and the extract which flows through heater 25, are maintained at a vacuum corresponding to the pressure of water vapor at 30° C.–55° C. The maximum pressure of evaporation and concentration is 120 millimeters of mercury.

The recycling pipe 28a is optional. This pipe 28a is controlled by a valve. By controlling the valve of optional pipe 28a, the pump 26 optionally repumps any selected part of the extract back into heater 25 for further evaporation and concentration.

The pump 26 pumps the concentrated, stripped extract into the storage tank 27.

A selected ratio of the concentrated, stripped extract which is thus collected in tank 27, is mixed with the aqueous aromatic fraction which is collected in tank 24, in a suitable mixing vessel, in which these liquids are thoroughly mixed to form a final liquid mixture. This mixing and stirring can be done in tank 27. The valved pipe 27a connects tank 24 to tank 27.

The final liquid mixture is pumped from mixing tank 27 by pump 28 through conventional spray nozzles (not shown) and said final liquid mixture is impregnated with carbon dioxide or nitrogen or other gas in chamber S intermediate pump 28 and said spray nozzles, and said impregnated, final mixture is spray-dried in the conventional spray-drying chamber 29, where the gas is released during the spray-drying. The powdered extract is collected in tank 29a.

As above noted, the outlet pipe 14 may have a conventional device, not shown, for continuously measuring and controlling the specific gravity and the solids content of the original dilute tea extract which flows through said pipe 14. Said specific gravity and solids content can be controlled by controlling the feed of the tea leaves from magazine 12, or by controlling the flow of extracting water through extracting pipe 10a.

A similar measuring device and control may be located in the exit pipe of the separator 25a. The respective quantities of the stripped, concentrated extract of the separated aqueous fraction of the aromatic or flavoring ingredients may be separately weighed, or they may be selected by a conventional proportionating-pump.

*Example*

One hundred kilograms of tea leaves are subjected to counter-current extraction with 1100 kilograms of water. The inlet temperature of said water is substantially 100° C. The extracting temperature in the extracting tube is substantially 90° C. to 100° C.

600 kilograms of original, dilute tea-extract are thus obtained. The original, dilute tea-extract has 5% by weight of water-soluble extracted tea-leaf material, corresponding to a dry weight of substantially 30 kilograms of water-soluble extracted tea-leaf material.

This dilute extract is filtered. The filtered extract is introduced into the top of the stripping column at substantially 100° C. The stripping steam enters the bottom of the stripping column at substantially 100° C.

The stripping steam is intimately mixed in contact with the downwardly flowing liquid in the stripping column, with only slight condensation of the steam in the stripping column.

20 kilograms of a separated aromatic aqueous fraction flow out of the top of the stripping column, in vapor form, as a mixture of water vapor and the vaporized aromatic ingredients. The fraction is condensed, to provide an aqueous solution of the aromatic ingredients. The water for this aqueous fraction of 20 kilograms is supplied by the stripping steam. In this example, 24 kilograms of steam are used in this stripping step. About 4 kilograms of stripping steam are condensed in the stripping column.

Hence about 604 kilograms of stripped extract flow out of the bottom of the stripping column.

The residual 604 kilograms of stripped extract are continuously concentrated by evaporation at 55° C., at the pressure of water vapor at 55° C. This results in a stripped concentrate whose weight is substantially 60 kilograms, and which has substantially 50% of solids by weight.

The previously separated aqueous fraction of the aromatic or flavoring ingredients is mixed with said concentrate of the stripped extract in selected ratio, at 45° C., to make a final mixture, which is promptly, substatnially saturated with carbon dioxide gas at 45° C., for prompt spray-drying.

This final mixture, prior to adding the carbon dioxide gas has 37.5% of solids by weight.

The resultant spray-dried powder has a specific gravity or bulk density of a maximum of 0.20 gram per cubic centimeter, such as a bulk density of 0.15 gram to 0.18 gram per cubic centimeter.

Upon dissolving 0.8 gram to 1.0 gram of this powder per 200 cubic centimeters of water, the resultant beverage has the typical character and composition of a fresh tea-infusion.

Some variation of the above are as follows:

If 100 kilograms of tea leaves are used, the weight of the extracting water may be 600 kilograms to 1500 kilograms. Depending upon the size and structure of the tea-leaves, and the extracting temperature, about 300 kilograms of the extracting water may in some cases be absorbed by the 100 kilograms of tea leaves. Hence, if it is desired to have 600 kilograms of original, dilute tea-extract the weight of the extracting water may be 900 kilograms.

Depending upon the ratio by weight of tea leaves to extracting water, the weight of the original dilute extract obtained from 100 kilograms of tea leaves, may be 300 kilograms to 1200 kilograms. This original dilute tea extract may have from 2.5% to 10% of water-soluble, dissolved tea-substances.

The weight of the steam used in the stripping operation is usually 4% to 5% of the weight of the respective dilute, original extract.

The weight of the separated aqueous aromatic fraction is usually 3% to 4% of the weight of the respective dilute original extract.

After the aqueous aromatic fraction has been separated, the residue of the original dilute extract may be concentrated at 30° C. to 55° C., at the respective pressure of water vapor at the respective temperature.

The resultant concentrate may have 40% to 55% of solids by weight.

The separated, aqueous aromatic fraction may be mixed with the concentrate at 45° C.–50° C.

Instead of using carbon dioxide, I can use nitrogen or other gas, in order to produce a spray-dried powder of low bulk density.

Prior to adding the gas, the final mixture may have 35% to 40% of dissolved solids by weight.

The extracting temperature may be as low as 60° C., as in a range of 60° to 70° C.

The invention is defined in the appended claims.

I claim:

1. A method of making a powdered tea extract from tea leaves, which consists in extracting tea leaves during a maximum period of substantially ten minutes by counter-current extraction with water at a temperature of substantially 60° C. to substantially 100° C., the weight of said water being substantially 6 times to substantially 15 times the weight of said tea leaves, thus producing an original dilute tea extract which has from substantially 2.5% to substantially 10% of dissolved tea solids by weight, then stripping said original dilute extract with steam as substantially 95° C. to substantially 100° C., the weight of said steam being substantially 4% to substantially 5% of the weight of said original, dilute extract, to produce a separated aqueous aromatic fraction whose weight is substantially 3% to substantially 4% of the weight of said original dilute tea extract, and promptly cooling said aromatic fraction below 70° C.; separately concentrating the residual extract by evaporation in a range of substantially 30° C. to substantially 55° C. and at a pressure which is the pressure of water vapor at substantially 30° C. to 55° C., to provide a concentrated residual extract which has substantially 35% to substantially 50% of solids by weight; mixing said aromatic aqueous fraction and said concentrated residual extract to form a resultant mixture, impregnating said resultant mixture with an inert gas and then spray-drying the impregnated mixture, enough impregnating gas being added to provide a spray-dried powder whose bulk density is a maximum of 0.20 gram per cubic centimeter.

2. A method according to claim 1, in which the inert gas is carbon dioxide, and said mixture is saturated with the carbon dioxide at a temperature of substantially 45° C.

3. A method according to claim 1, in which the inert gas is nitrogen.

References Cited in the file of this patent

UNITED STATES PATENTS

| | | |
|---|---|---|
| 2,235,700 | Eldred | Mar. 18, 1941 |
| 2,513,813 | Milleville | July 4, 1950 |
| 2,788,276 | Reich | Apr. 9, 1957 |

FOREIGN PATENTS

| | | |
|---|---|---|
| 22,590 | Great Britain | 1898 |